United States Patent
Marchione

(10) Patent No.: US 10,549,519 B2
(45) Date of Patent: Feb. 4, 2020

(54) SYSTEMS AND METHODS FOR CALIBRATING ADDITIVE MANUFACTURING OPERATIONS BASED ON ENERGY DENSITY

(71) Applicant: Caterpillar Inc., Peoria, IL (US)

(72) Inventor: Thierry Marchione, Heber City, UT (US)

(73) Assignee: Caterpillar Inc., Peoria, IL (US)

( * ) Notice: Subject to any disclaimer, the term of this patent is extended or adjusted under 35 U.S.C. 154(b) by 367 days.

(21) Appl. No.: 15/404,968

(22) Filed: Jan. 12, 2017

(65) Prior Publication Data
US 2018/0193959 A1    Jul. 12, 2018

(51) Int. Cl.
| | | |
|---|---|---|
| B23K 26/70 | (2014.01) |
| B23K 26/342 | (2014.01) |
| B29C 67/00 | (2017.01) |
| B33Y 10/00 | (2015.01) |
| B33Y 30/00 | (2015.01) |
| B33Y 50/02 | (2015.01) |
| B29K 105/00 | (2006.01) |

(52) U.S. Cl.
CPC .............. B33Y 50/02 (2014.12); B33Y 10/00 (2014.12); B33Y 30/00 (2014.12); *B29K 2105/251* (2013.01)

(58) Field of Classification Search
CPC ......... B33Y 10/00; B33Y 30/00; B33Y 50/02; B22F 3/00; B22F 3/1055; B22F 3/1057; B29K 2105/251
USPC ...................................................... 219/76.12
See application file for complete search history.

(56) References Cited

U.S. PATENT DOCUMENTS

| | | | | |
|---|---|---|---|---|
| 5,147,999 A | * | 9/1992 | Dekumbis ............ | B23K 26/324 219/121.63 |
| 5,182,056 A | * | 1/1993 | Spence ................. | G01J 1/4257 118/423 |
| 5,352,495 A | * | 10/1994 | Henderson ......... | B23K 26/0734 427/554 |
| 5,826,772 A | * | 10/1998 | Ariglio .............. | B23K 26/0736 225/2 |

(Continued)

OTHER PUBLICATIONS

Transverse mode. (Apr. 26, 2017). In Wikipedia, The Free Encyclopedia. Retrieved 13:30, Jun. 7, 2017, from https://en.wikipedia.org/w/index.php?title=Transverse_mode&oldid=777241602.

*Primary Examiner* — Eric S Stapleton
(74) *Attorney, Agent, or Firm* — Miller, Matthias & Hull

(57) ABSTRACT

A system for additive manufacturing includes a laser configured to produce a laser beam having a laser spot area and configured to operate at a transverse speed. The system includes a power source configured to power the laser to selectively heat the powdered material at a configurable power level. The system includes a controller configured to determine an energy density for an ideal build for the object, the ideal build having ideal surface properties for the ideal build including a bead overlap and a build layer thickness, the energy density being based on a plurality of parameters, which include the power level, the laser spot area, the transverse speed, the bead overlap, and the build layer thickness. The controller is configured to calibrate one or both of the power source and the laser based, at least, on the energy density, and execute, after calibration, toolpath instructions to form the object.

20 Claims, 6 Drawing Sheets

(56) References Cited

U.S. PATENT DOCUMENTS

| | | | | |
|---|---|---|---|---|
| 5,961,861 A * | 10/1999 | McCay | B23K 26/032 | 219/121.83 |
| 6,872,912 B1 * | 3/2005 | Wos | B23K 26/18 | 219/121.64 |
| 7,586,061 B2 * | 9/2009 | Hoebel | B23K 26/032 | 219/121.83 |
| 7,704,565 B2 * | 4/2010 | Slaughter | B22F 3/1055 | 355/53 |
| 7,777,155 B2 * | 8/2010 | Twelves, Jr. | B23P 21/004 | 219/121.86 |
| 9,044,827 B2 * | 6/2015 | Song | B23K 26/03 | |
| 9,168,613 B2 * | 10/2015 | Colby | B23K 26/0823 | |
| 2014/0163717 A1 * | 6/2014 | Das | B22F 3/1055 | 700/119 |
| 2014/0265045 A1 * | 9/2014 | Cullen | B29C 64/205 | 264/497 |
| 2015/0129688 A1 * | 5/2015 | Buchanan | B23K 26/388 | 239/589 |
| 2015/0190971 A1 * | 7/2015 | Musuvathy | B29C 64/386 | 700/98 |
| 2015/0310148 A1 * | 10/2015 | Lacaze | G06F 17/5018 | 703/1 |
| 2015/0336331 A1 * | 11/2015 | Potter | G01N 23/046 | 264/40.1 |
| 2015/0362898 A1 * | 12/2015 | Potter | G05B 19/4099 | 700/98 |
| 2016/0046076 A1 * | 2/2016 | Huang | B29C 64/386 | 700/98 |
| 2016/0108814 A1 * | 4/2016 | Schmitz | F02C 7/10 | 60/39.511 |
| 2016/0114439 A1 * | 4/2016 | Pal | B23P 15/26 | 165/185 |
| 2016/0279707 A1 * | 9/2016 | Mattes | B41J 2/451 | |
| 2016/0375490 A1 * | 12/2016 | Marchione | B22F 3/1055 | 419/55 |
| 2017/0090462 A1 * | 3/2017 | Dave | B33Y 50/00 | |
| 2017/0203512 A1 * | 7/2017 | Gold | B33Y 10/00 | |
| 2017/0246810 A1 * | 8/2017 | Gold | B33Y 50/02 | |
| 2017/0364058 A1 * | 12/2017 | Jagdale | G05B 19/4099 | |

* cited by examiner

SYSTEMS AND METHODS FOR CALIBRATING ADDITIVE MANUFACTURING OPERATIONS BASED ON ENERGY DENSITY

TECHNICAL FIELD

The present disclosure generally relates to additive manufacturing systems and, more particularly, relates to systems and methods for calibrating apparatus used in additive manufacturing.

BACKGROUND

Additive manufacturing, also known as three-dimensional (3-D) printing, can be used for manufacturing an extremely wide array of 3-D objects. By utilizing additive manufacturing, the object designer has few restrictions on what he/she can create. Such unique, minimally restricted manufacturing can be performed in both a time-effective and cost-effective manner, when utilizing additive manufacturing.

In particular, additive manufacturing is valuable in the production of metal machine components because it can reduce the need for casting. Casting may be cost prohibitive, especially when used to create small-scale production components, such as parts for old machines, parts for small-scale produced machines, or custom components. By utilizing additive manufacturing of metal components, metal components can be manufactured in a cost-effective manner and time-effective manner.

Often, laser sintering techniques are employed to produce metal objects via additive manufacturing. Additive manufacturing employing laser sintering, often referred to as "selective laser sintering" (SLS) or "powder bead fusion" (PBF) techniques, involves using a laser to selectively heat a powdered material to bond the powder into a solid layer of an object. Powder bead fusion produces objects in a layer-wise manner, wherein each layer of the object is fused to the previous layer.

In powder bead fusion operations, build stability and build surface qualities are paramount to successful additive manufacturing of an object. To aid in structural stability of the object, improves have been made to the metallic powders, themselves, such that powders have been developed that include additives to stiffen the powder and, potentially, improve structural characteristics, as can be seen in U.S. Pat. No. 8,719,144 ("Powder for Layerwise Manufacturing of Objects").

However, additives in the powder used may not be sufficient for providing a dense, ideal build of an object during PBF additive manufacturing. Accordingly, machines for performing PBF require, often time consuming, calibration to produce an optimum build, which is often based solely on trial and error and can be very time consuming. Therefore, systems, methods, and apparatus for additive manufacturing, wherein parameters of the build are efficiently configured for an ideal build, based on some empirical measures, are desired.

SUMMARY

In accordance with one aspect of the disclosure, a system for manufacturing an object from a powdered material is disclosed. Such manufacturing may be based, at least, on toolpath instructions. The system may include a laser configured to selectively heat the powdered material, to form the object, in a series of layer-wise iterations. The laser may be configured to produce a laser beam having a laser spot area, the laser spot area being an area in which the laser selectively heats the powdered material, the laser spot area being configurable, and the laser configured move above the powdered material, during execution of the toolpath instructions, at a transverse speed. The system may further include a power source configured to power the laser to selectively heat the powdered material, the power source having a power level that is configurable. The system may further include a controller, including a processor, configured to determine an energy density for an ideal build for the object, the ideal build having ideal surface properties for the ideal build including, at least, a bead overlap and a build layer thickness, the energy density being based on a plurality of parameters, which include, at least, the power level, the laser spot area, the transverse speed, the bead overlap, and the build layer thickness. The controller may further be configured to determine calibration instructions for calibrating one or both of the power source and the laser based, at least, on the energy density, calibrate one or both of the power source and the laser based, at least, on the calibration instructions, and execute, after calibration, toolpath instructions to form the object.

In accordance with another aspect of the disclosure, a method for configuring a 3-D printer for manufacturing an object, from a powdered material, for an ideal build of the object, the 3-D printer including, at least, a laser and a power source. The method may include determining a transverse speed, for the laser, for building the object based on the ideal build, determining a laser spot area, for the laser, for building the object based on the ideal build, and determining a bead overlap and a build layer thickness for building the object based on the ideal build. The method may further include determine an energy density necessary for the ideal build, the energy density based, at least, on the transverse speed, the laser spot area, the bead overlap, the build layer thickness, and a configurable power level for the power source, the power source configured to power the laser to selectively heat the powdered material. The method may further include determining calibration instructions for calibrating the 3-D printer based, at least, on the energy density and calibrating the 3-D printer based, at least, on the calibration instructions.

In accordance with yet another aspect of the disclosure, a three-dimensional (3-D) printer is disclosed. The 3-D printer may include an object bed on which one or more objects are formed, a powder bed for providing a powdered material to the object bed, and a roller for spreading the powdered material on the object bed as a powder layer. The 3-D printer may include a laser configured to selectively heat the powdered material, to form the object, in a series of layer-wise iterations. The laser may be configured to produce a laser beam having a laser spot area, the laser spot area being an area in which the laser selectively heats the powdered material, the laser spot area being configurable, and the laser configured move above the powdered material, during execution of the toolpath instructions, at a transverse speed. The 3-D printer may further include a power source configured to power the laser to selectively heat the powdered material, the power source having a power level that is configurable. The 3-D printer may further include a controller, including a processor, configured to determine an energy density for an ideal build for the object, the ideal build having ideal surface properties for the ideal build including, at least, a bead overlap and a build layer thickness, the energy density being based on a plurality of parameters, which include, at least, the power level, the laser spot area, the transverse speed, the bead overlap, and the build layer thickness. The controller may further be configured to determine calibration instructions for calibrating one or both of the power source and the laser based, at least, on the energy density, calibrate one or both of the power source and the laser based, at least, on the calibration instructions, and execute, after calibration, toolpath instructions to form the object.

Other features and advantages of the disclosed systems and principles will become apparent from reading the following detailed disclosure in conjunction with the included drawing figures.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
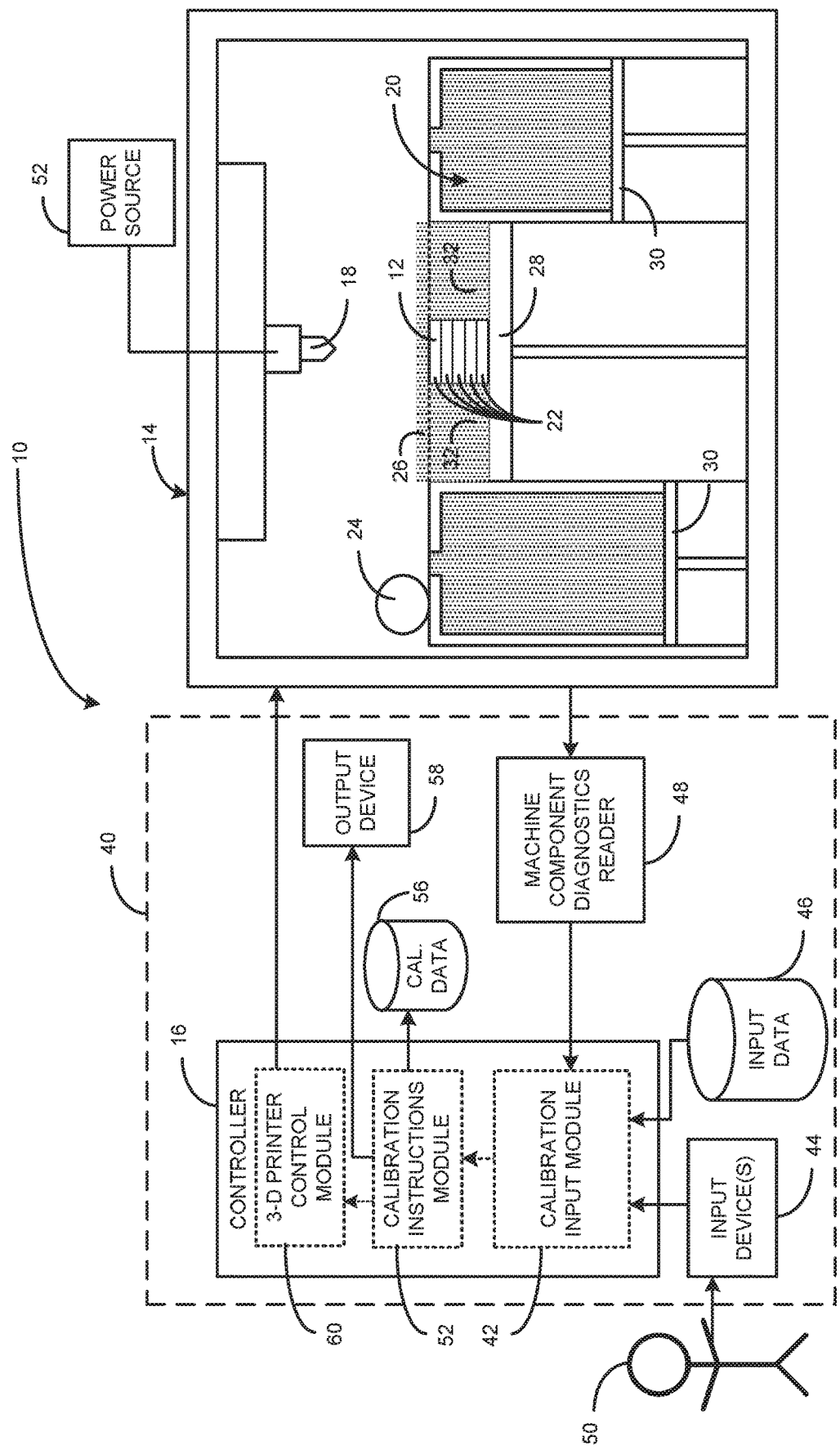
FIG. 1 is a schematic representation of a system for manufacturing objects, the system including a 3-D printer, associated 3-D printer components, and a controller configured to execute instructions to calibrate the 3-D printer and/or associated components, in accordance with an embodiment of the present disclosure.

Turning now to the drawings and with specific reference to FIG. 1, a system 10 for manufacturing an object 12 is disclosed. The system 10 may manufacture the object 12 using additive manufacturing, which may also be referred to as three-dimensional (3-D) printing. To 3-D print the object 12, the system 10 includes the 3-D printer 14 and its associated elements, which are explained in more detail below. The 3-D printer 14 may receive instructions for 3-D printing the object 12 from the controller 16. Any known method of 3-D printing can be used in conjunction with the system 10, such as, but not limited to, powder bead fusion (PBF) techniques.

The 3-D printer 14 employs a laser 18 to selectively heat portions of a powdered material 20 to form the object 12 in a series of layers 22 during a series of layer-wise iterations of the laser 18. "Layer-wise," generally, refers to the manufacturing of a structure by subdividing the construction into a series of layers and compiling the structure as a series of layers. Each of such a series of layers is performed iteratively by the 3-D printer 14, and, therefore the object 12 is formed in a series of layer-wise iterations. For performing the selective heating, the laser 18 may be any selective heating laser, such as a powder bead fusion laser for performing powder bead fusion. The powdered material 20 may be any type of material that can be selectively heated to form the object 12, which may include, for example, nylon additive material powders and metallic material powders. The powdered material 20 may further include any additives known in the art to aid in bonding, stiffening, or otherwise provide structural support in the manufacturing process of the object 12.

The series of layer-wise iterations of the laser 18 may be controlled in accordance with instructions stored on memory associated with the controller 16. Prior to each layer-wise iteration of the laser 18, a roller 24 lays a powder layer 26 of the powdered material 20 over an object bed 28, on which the object 12 will rest during 3-D printing. The powdered material 20 may be provided to the roller 24 for spreading by one or more powder beds 30. Additionally, the roller 24 may compact the powder layer 26 after laying the powder layer 26.

After each iteration of the laser 18, the object bed 28 may be lowered by a layer height. Then, another powder layer 26 may be laid over the object bed 28 so that the next iteration of the laser 18 may occur. After each iteration, excess powdered material 32 may remain on the object bed 28 and the next layer may be spread over the excess powdered material 32 by the roller 24. Such excess powdered material 32 may remain on object bed 28 and can act as a support base for the currently laid powder layer 26.

Each layer 22 of the object 12 is selectively heated such that it fuses with the previously heated layer 22. The 3-D printer 14 may continue this process for however many layers 22 are required to manufacture the object 12. Once manufacturing is completed, the object 12 may be removed from the 3-D printer 14.

The controller 16 may be used, in conjunction with elements of the 3-D printer 14 and/or other components, as part of a system 40 for calibrating the 3-D printer 14, and any elements thereof, and controlling the 3-D printer 14, to manufacture objects. While depicted as a system independent of the 3-D printer 14, in some examples, the system 40 and/or any components thereof may be components of and part of the 3-D printer 14, itself. As depicted, the controller 16 may include a plurality of modules, which may be machine-executable instructions for performing tasks and/or generating instructions associated with calibration of the 3-D printer 14 and/or control of the 3-D printer 14.

To that end, the controller 16 may include and/or execute a calibration input module 42, which determines values for 3-D printing and/or material-based parameters, from which calibration of the 3-D printer 14 may be derived and/or determined. For generating and/or receiving said 3-D printing and/or material-based parameters, the controller 14 may be operatively associated with one or more of input device(s) 44, input data storage 46, and/or a machine component diagnostics reader 48.

The input device(s) 44 may include one or more input devices capable of allowing an operator 50 to input data associated with parameters for 3-D printing and/or materials used in 3-D printing. For example, the controller 16 may prompt the operator 50 to input values for various parameters associated with a 3-D printing process and/or material used by the 3-D printer 14 and, in response to the prompt, the operator 50 inputs such parameters via the input device(s) 44. Accordingly, the input device(s) may include, but are certainly not limited to including, a keyboard, a button, a touchscreen, a lever, a stylus input, a mouse, a trackball, and the like.

Further, data associated with 3-D printing and/or materials used in 3-D printing by the 3-D printer 14 may be stored, for use by the controller 16, on the input data storage 46. Said stored data may be input previously by, for example, the operator 50 or may be commonly known data associated with the 3-D printer 14 and, thusly, is included and stored. The input data storage 46 may be any machine readable medium capable of storing data and/or instructions associated with said data and readable by the controller 16. Accordingly, the input data storage 46 may be part of a memory included with the controller 16 and/or may be or may be part of any memory external to the controller 16 that is in data communication with the controller 16. Examples of machine readable media, internal memory, and external memory are discussed in more detail below, with reference to FIG. 7.

In addition to or as an alternative to the input device(s) 44 and the input data storage 46, the controller 16 may receive data indicative of parameters associated with 3-D printing by the 3-D printer 14 and/or parameters of materials used by the 3-D printer 14 via the machine component diagnostics reader 48. The machine component diagnostics reader 48 may be any system sensors or devices capable of determining parameters and/or characteristics of the 3-D printer 14 components and any materials or test print structures therein. For example, the machine component diagnostics reader 48 may include one or more cameras having microscopic-level zooming capabilities, that are capable of detecting dimensions of laser beam spot areas, layer thicknesses in a build, and/or weld bead overlap distances. Additionally or alternatively, the machine component diagnostics reader 48 may include sensors and/or output devices associated with a power source 52 which may output power levels, provided by the power source 52 to the laser 18. Further, the machine component diagnostics reader 48 may include any cameras, speedometers, accelerometers, positioning devices, inertial measurement units (IMUs), and the like, capable of determining a transverse speed of the laser 18, during 3-D printing operations. Of course, the machine components diagnostic reader 48 may include or be otherwise associated with any sensors or output devices that may provide information or data relevant to the determination of parameters associated with 3-D printing processes and/or materials.

The information determined and/or gathered by the calibration input module 42 may then be communicated to a calibration instructions module 52. The calibration instructions module 52 may generate data and/or instructions for configuring the 3-D printer 14 to perform additive manufacturing, from a powdered material, based on an energy density derived from the data of the calibration input module 52, which is discussed in more detail below with reference to FIG. 2. In some examples, such calibration instructions and/or data may be communicated to one or both of calibration data storage 54 and an output device 56. The calibration data storage 54 may be any machine readable medium on which calibration data may be stored for future use in 3-D printing operations. Accordingly, the calibration data storage 54 may be part of a memory included with the controller 16 and/or may be or may be part of any memory external to the controller 16 that is in data communication with the controller 16. Examples of machine readable media, internal memory, and external memory are discussed in more detail below, with reference to FIG. 7. The output device 58 may be any device that is operatively associated with the controller 16 and/or in operable communication with the controller 16 that may receive the calibration data, for one or both of future use in 3-D printing or for presentation of the data.

Instructions and/or data generated by the calibration instructions module 52 may then be used by a 3-D printer control module 60, to configure the 3-D printer 14 for desired operations. The 3-D printer control module 60 may cause parameters of the 3-D printing processes to be altered (e.g., power level of the power source 52, transverse speed of the laser 18, laser spot area of the laser 18, etc.). Further, the 3-D printer control module 60 may, once the 3-D printer 14 is calibrated, execute toolpath instructions for the 3-D printer 14 to build an object out of the powdered material.

Figure 2:
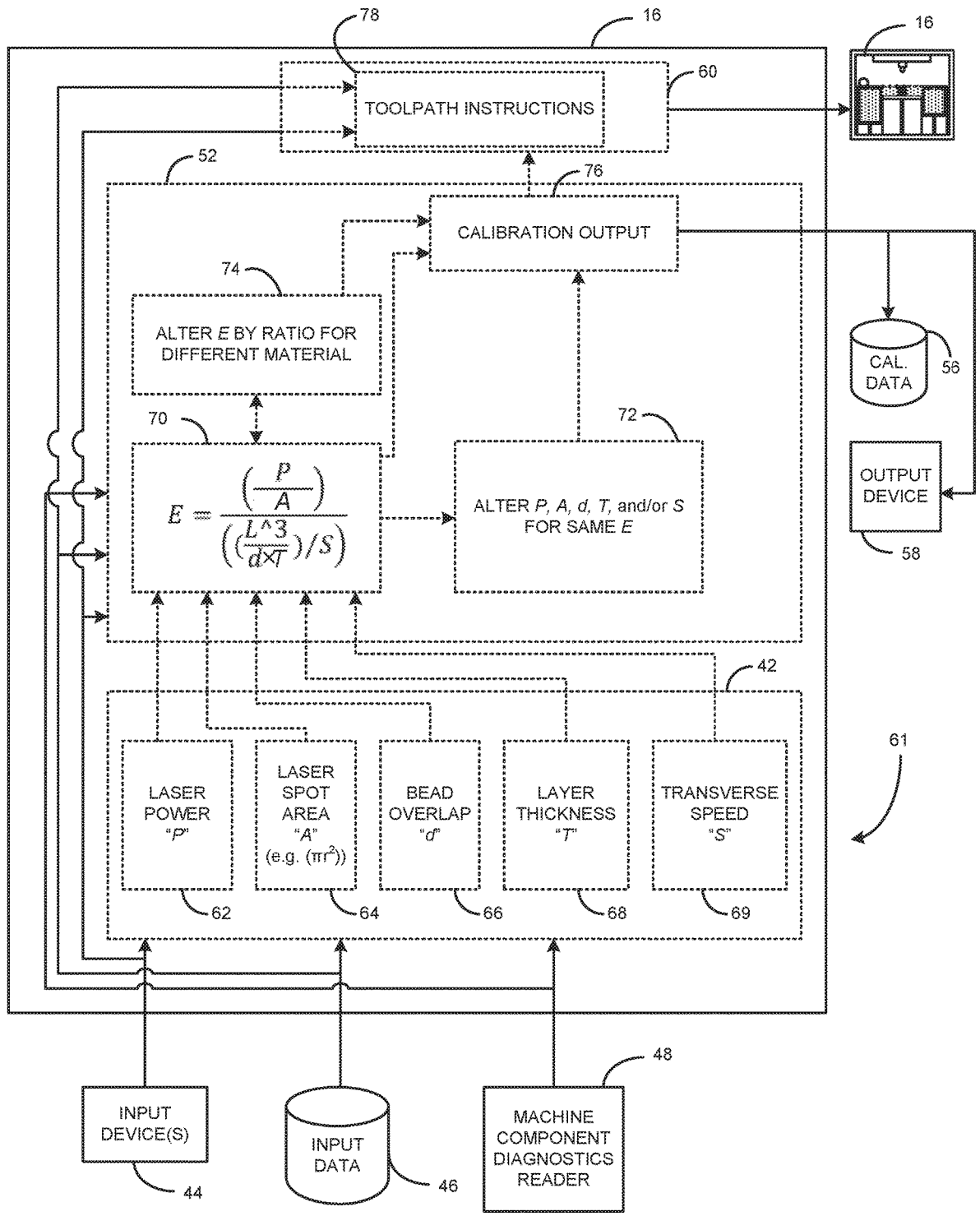
FIG. 2 is a schematic representation of the controller of FIG. 1 and instruction-based modules, stored and/or executed thereon, for calibrating the 3-D printer and/or associated components, in accordance with FIG. 1 and the present disclosure.

Turning now to FIG. 2, another schematic diagram of the controller 16 illustrates the calibration and control functions of the controller 16 and any instructions executed by the controller 16, as depicted by the exemplary modules 42, 52, 60. As discussed above, the calibration input module may receive or derive various parameters 61, for calibration, from one or more of the input device(s) 44, the input data storage 46, and the machine component diagnostics reader 48. While certainly not limited to the following parameters, the parameters received by or derived by the calibration input module 42 include a laser power 62 ("P") of the laser 18, a laser spot area 64 ("A") of a laser beam generated by the laser 18, a bead overlap distance 66 ("d") of consecutive beads for an ideal build, a layer thickness 68 ("T") for a layer of an ideal build, and a transverse speed 69 ("S") for the laser 18 during a build of an object made of the powdered material.

The parameters 61 may be configured for an ideal build of an object from a chosen material for the 3-D printing operation. An "ideal build," as referenced herein, may, generally refer to a build of an object, via 3-D printing that has user-defined "ideal" surface properties. In some examples, such ideal surface properties may include having a build with a high material density, having a build that has minimal porosity, having a build with minimal roughness on a surface of a build layer, and any other desired properties for a build. It is to be understood that one actor's "ideal" properties may not be ideal to another actor, and therefore the ideal properties, as discussed, may be any properties that a user wishes to remain consistent over multiple builds.

In determining the parameters 61 for an ideal build, various experimental processes may be used to determine such parameters. In some examples, determining parameters 61 for an ideal build may begin by testing multiple single weld beads through printing said beads at different lens focus levels for the laser 18, wherein altering lens focus levels may alter the laser spot area 64 of the laser 18. From the single weld bead printing test, an observer may find the weld bead on the test surface that has the desired properties (e.g., continuous surface on the bead, lacking porosity, smoothness of the bead, etc.). From that ideal bead determined, an observer may estimate the radius or diameter of the laser spot, to be used in determining the laser spot area 66, as it may be substantially similar to a radius or diameter of a single weld bead.

With an idea single weld bead determined by the experimental process discussed above, an observer may then perform surface testing by printing overlapping weld beads to obtain measurements for cross-sections of the build and surface roughness of the build. In terms of generating an "ideal" test build, such a build may have low porosity, smooth surfaces with no high spikes, peaks, or valleys, and maintaining smoothness while also having a dense build. When the build is determined satisfactory, as ideal, per the qualifications of an observer, the layer thickness 68 and weld bead overlap 66 may be measured. As shown in the magnified, to a microscopic level, view of FIG. 3, two overlapping weld beads 63a, 63b may be used to determine some of the parameters 61. As shown, the layer thickness 68 may be a thickness of such a layer comprising the weld beads 63a, 63b. Further, the weld bead overlap 66 may be defined as the distance in which two weld beads, of a layer, overlap. During this process of creating a layer with ideal surface properties, the transverse speed 69 may also be noted and used in further calibration.

Figure 3:
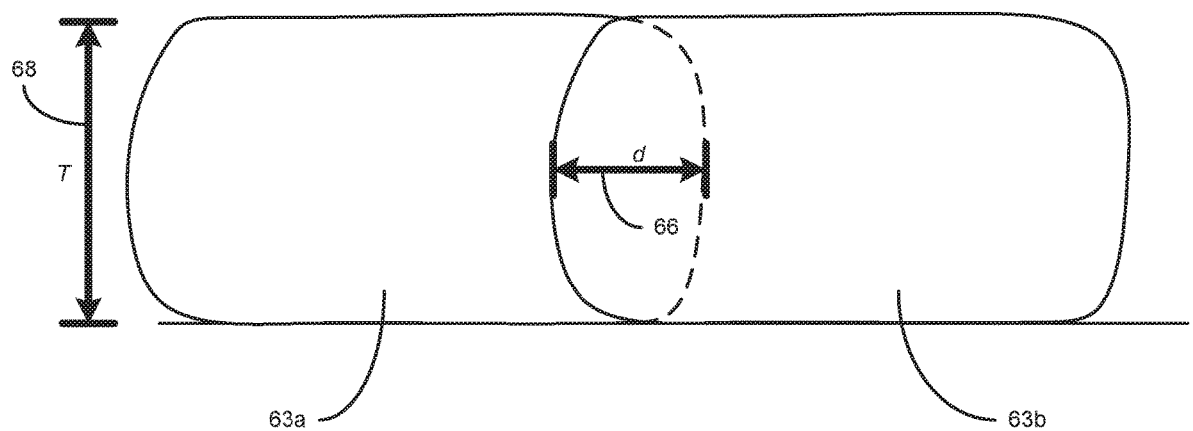
FIG. 3 is a side view of a microscopic enlargement of example weld beads of a material from which an object may be manufactured by the system(s) of FIGS. 1 and 2, illustrating dimensional characteristic, in accordance with the present disclosure.
Figure 4:
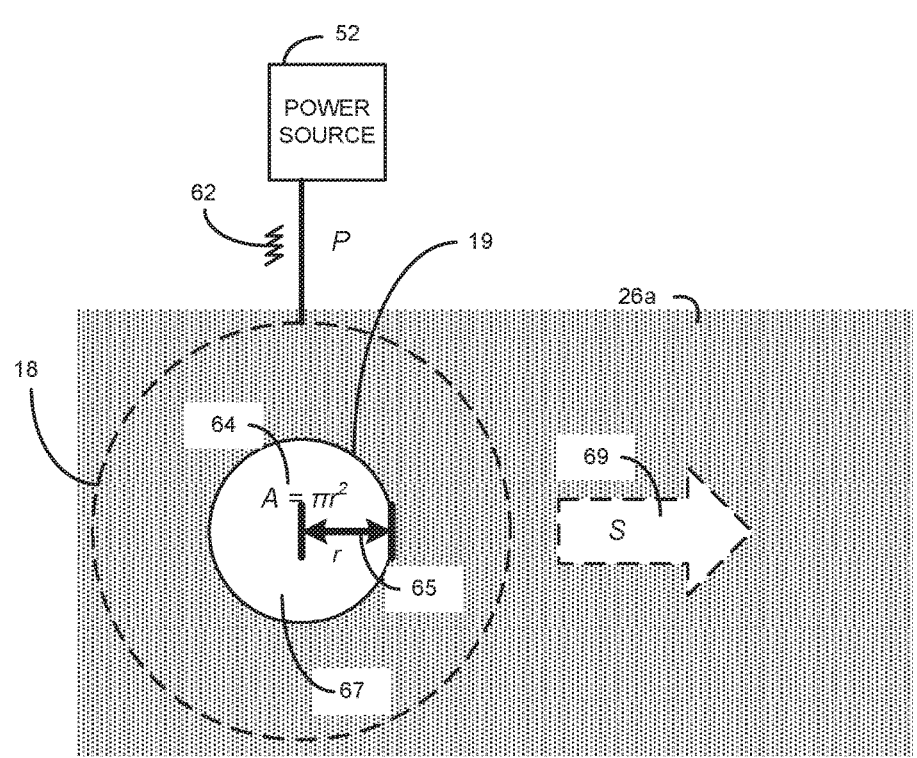
FIG. 4 is a top view of a layer of material, a laser of the 3-D printer of FIG. 1, and a beam generated by the laser, illustrating dimensional characteristics of the beam, in accordance with the present disclosure.
Figure 5:
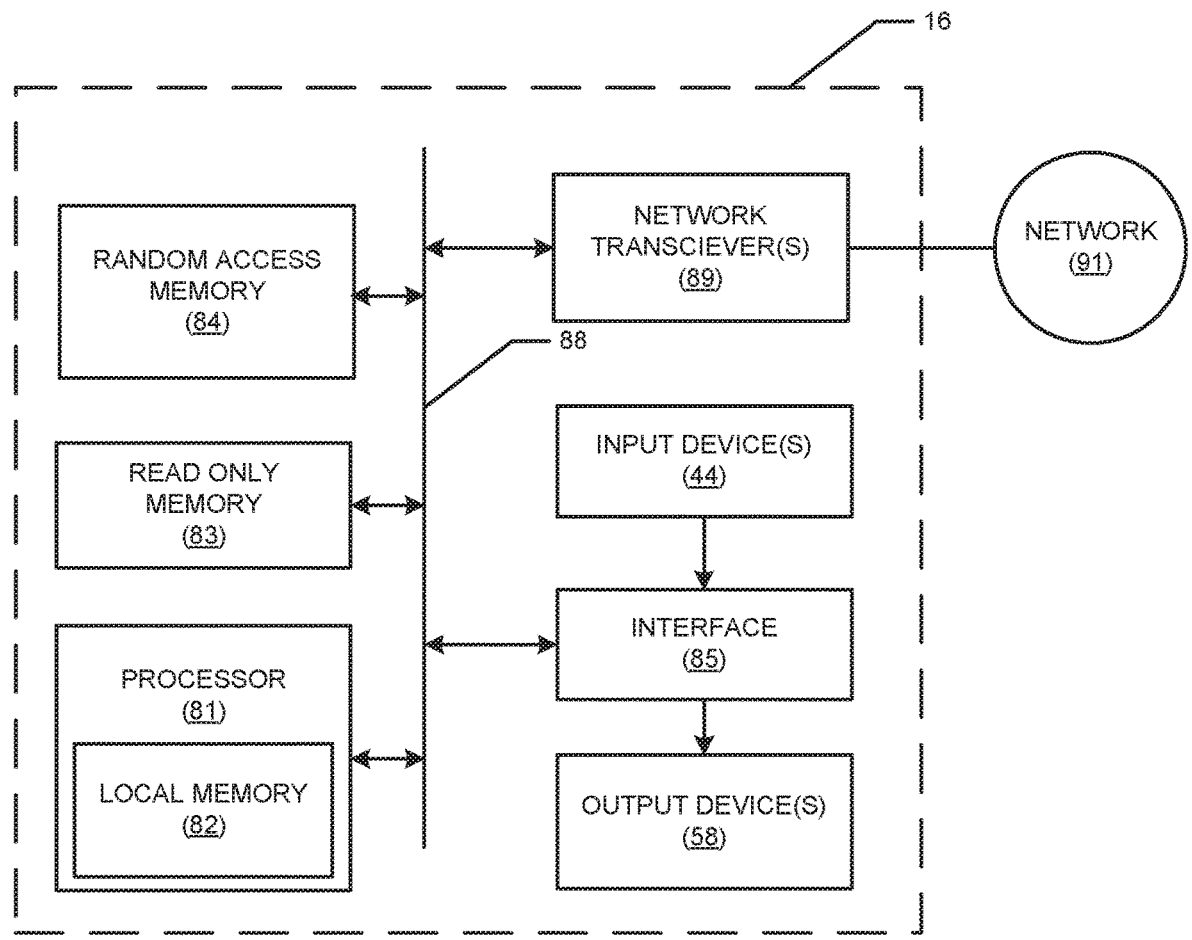
FIG. 5 is a schematic depiction of physical components which may be utilized to, at least in part, embody the controller of FIGS. 1-2, in accordance with the present disclosure.

To further illustrate the parameters 61 and details thereof, FIG. 4 illustrates a top view of a 3-D printing test process, such as the above described process that generated the overlapping beads 63a, 63b of FIG. 3, in which the laser 18 generates a laser beam 19 to selectively heat a powder layer 26a, during the test process. As the power source 52 powers the laser 18 at the power level 62 and the laser 18 selectively heats the layer 26a while moving at the transverse speed 69, the laser beam 19 may have a laser spot 67, which has a spot area defined by the laser spot area 64. A laser spot, as defined herein, may be the dimensional area in which the laser has heating "contact" with the powder layer 26a, that is, it is a two dimensional area on the powder layer 26a that is affected by the beam 19, if the beam were static. In the non-limiting example shown in FIG. 4, the laser spot 67 is generally circular in shape and, thus, the laser spot area 64 may be derived from a radius 65 ("r") of the laser spot 67. However, the laser spot 67 is certainly not limited to being generally circular and may take on any shape that the laser 18 is capable of generating.

As discussed above, the calibration input module 42 may either receive direct values for any of the parameters 61 and/or the calibration input module 42 may derive any of the parameters 61 from input received. With each of the parameters 61 determined, at least, each of the shown parameters may be used by the calibration instructions module 52 to determine calibration instructions.

Any calibration instructions determined by the calibration instructions module 52 are based, at least, on an energy density ("E") 70 that is required for the ideal build for the object. As discussed above, the ideal build includes ideal surface properties for the ideal build, which may include, at least, the bead overlap 66 and the build layer thickness 68. The energy density 70 may be defined as a volumetric density of energy applied to the powdered material, during a build of an object, of the powdered material, by the 3-D printer 14. Accordingly, the standard unit for energy density, generally, is Joules/meter³. The energy density 70 may be based on, at least, the power level 62, the laser spot area 64, the transverse speed 69, the bead overlap, and the build layer thickness 68. By keeping the energy density 70 substantially unchanged, while the other parameters 61 can be altered, so long as the energy density 70 remains constant, the ideal build can be maintained over different 3-D printing apparatus and additive manufacturing methods, having configurable parameters. Accordingly, the energy density 70, at least initially, may be provided by user input for a given material, which may be determined semi-empirically, and then altered, or utilized for altering parameters thereof, for upgrading performance and/or switching materials.

To that end, the energy density 70 may be calculated, by the controller 16 at, for example, the calibration instructions module 52, based on the following equation (1):

$$E = \frac{\left(\frac{P}{A}\right)}{\left(\left(\frac{L^3}{d \times T}\right)/S\right)}$$

wherein "L" is a dimensional constant, selected to normalize the equation such that the output energy density 70 is in Joules/meters³. For example, the laser power 62 may be measured in Watts, which is Joules/second, the laser spot area 64 may be measured in meters, the bead overlap 66 and layer thickness 68 may be measured in meters, and the transverse speed 69 may be measured in meters/second. In such examples, the dimensional constant L, the numerical value of which is arbitrary, may be 1 meter³; therefore, the resultant units for the energy density 70, when all the above conditions are used, will be Joules/meter³, which is an accepted unit of measure for energy density.

As discussed above, the laser spot area 64 may be, generally, circular in shape and, therefore, the laser spot area 64 may be derived from the radius 65. In such examples, the equation (1) may be rewritten to use the radius 65 in its calculations, such that the energy density 70 is calculated by equation (2):

$$E = \frac{\left(\frac{P}{\pi r^2}\right)}{\left(\left(\frac{L^3}{d \times T}\right)/S\right)}$$

wherein "L" is a dimensional constant, selected to normalize the equation such that the output energy density 70 is in Joules/meters³.

Any of the parameters 61 may be altered, for different calibration and/or 3-D printing scenarios, while maintaining the same energy density 70. To that end, a parameter alteration sub-module 72 of the calibration instructions module 52 may be utilized to alter one or more of the parameters 61, such that desired new parameters for one or more of the parameters 61 may be used for calibration; however, in such scenarios the energy density 70 value is maintained constant and only the parameters 61 may be changed. For example, consider that an energy density 70 for an ideal build is configured for a specific power 62 and traverse speed 69. However, when switching to a different machine incapable of achieving said transverse speed 69 but only a new transverse speed, the power level 62 may then be altered, such that when the transverse speed 69 is replaced with the new transverse speed, the resultant energy density 70, output by equation (1), is substantially similar to the original energy density 70. Such changes and subsequent alterations of parameters may be applied to any of the parameters 61 any number of times to achieve optimal ideal build conditions.

Additionally, in some examples, a user may desire a 3-D printing build having similar ideal properties to those described above, with respect to the first material, but built using a second material. In such examples, a material conversion sub-module 74 may be utilized, by which the energy density 70 may be altered by an energy compensation factor ("$e_c$") and then the parameters 61 may be reconfigured for the altered energy density. Therefore, the 3-D printer 14 may be calibrated to produce an object that is built from the second material, but has similar build properties to that of an object produced from the first material and configured to have the original energy density 70.

The energy compensation factor may be based on a ratio between a product of the first material's thermal conductivity ("$k_1$") and melting temperature ("$m_1$") and a product of the second material's thermal conductivity ("$k_2$") and melting temperature ("$m_2$"). Accordingly, the energy compensation factor may be defined by the following equation (3):

$$e_c = \frac{(k_1 \times m_1)}{(k_2 \times m_2)}$$

Thus, to determine a second energy density ("$E_2$") configured to produce an object of the second material having substantially similar build properties to that of an object produced from the first material, the following equation (4) may be utilized:

$$E_2 = E \times e_c$$

Using the second energy density, new parameters may be configured for the parameters 61 to achieve the second energy density, based on equation (1).

Output of the energy density 70, the parameter alteration sub-module 72, and/or the material alteration sub-module 74 may be received by a calibration output module 76. The calibration output sub-module 76 may provide calibration data and/or instructions to the 3-D printer control module 60, which may use said data and/or instructions to generate control commands to alter parameters 61 to calibrate the 3-D printer 16. In some examples, the calibration output sub-module 76 may provide any data and/or instructions to one or both of the calibration data storage 65 and the output device 58. In calibrating the 3-D printer 14 the controller 16 may transmit signals which would calibrate the power source 52 and/or the laser 18 based, at least, on the energy density 70 and the parameters 61 that were used to determine the energy density 70.

Once the 3-D printer 16 is calibrated, the controller 16, via the 3-D printer control module 60, may then execute toolpath instructions 78, to instruct the 3-D printer to build an object based thereon. The toolpath instructions 78 may be based on a digital model (e.g., a computer-aided drafting (CAD) model, a 3-D rendering, or any other digital model). Such path planning information and/or executable files, which may embody the toolpath instructions 78, are commonly known and used in various forms of additive construction and/or three-dimensional printing, wherein an object is formed by a machine based on a digital file, which provides a basis for control instructions to a 3-D printer. Such toolpath instructions 78, as plans and/or designs, can be transformed into cross-sections and used to form successive layers to be laid by the 3-D printer 14. Any digital file that provides control instructions for path planning may be used as or as part of the toolpath instructions 78, such as, but not limited to, a stereolithography (.stl) file format file, a Virtual Reality Modeling Language (VRML) format file, among other format files.

As mentioned above, the controller 16 may be used to configure the 3-D printer 14 control the elements of the 3-D printer 14 to manufacture objects. 3-D printing instructions may transform an object design (e.g., for the object 12) into cross-sections which are used to form successive layers (e.g., the layers 22) by the 3-D printer 14. Instructions executed by the controller 16, including the toolpath instructions 78 for the laser 18, which instruct the laser 18 to selectively heat the powder layer 26 as specific regions. Guidance of the laser 18 may be performed by any laser guidance device associated with the 3-D printer 14 such as, but not limited to, an X-Y direction actuator. Additionally, instructions executed by the controller 16 to control the 3-D printer 14 may include instructions for raising the powder bed 30 to provide powdered material 20 to the roller 24, instructions for laying the powder layer 26 over the object bed 28 using the roller 24, and/or instructions for lowering the object bed 28 after each layer-wise iteration of the laser 18.

Figure 7:
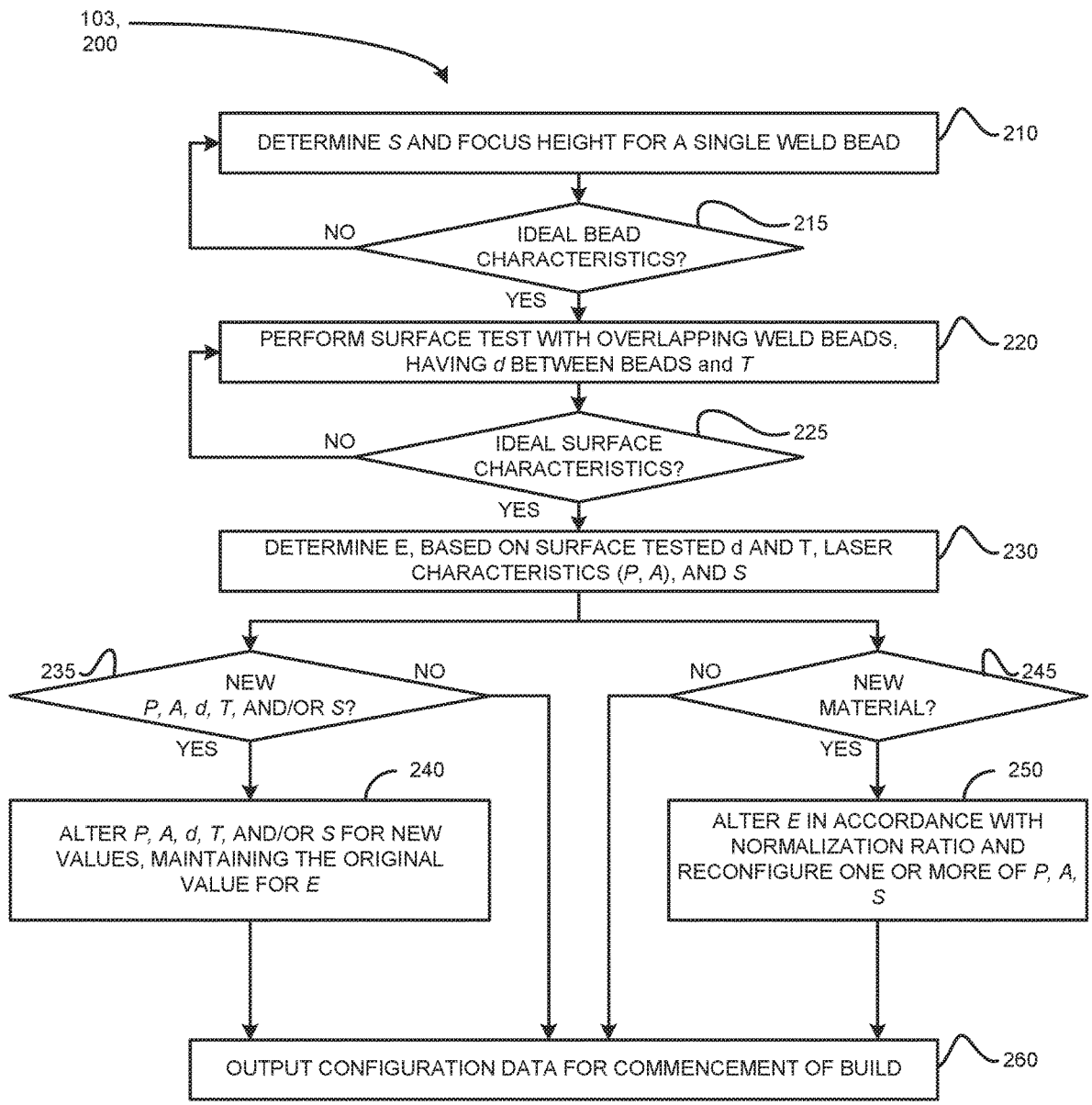
FIG. 7 is a block diagram illustrating a flow chart for a method for calibrating a 3-D printer and any components thereof, for use in conjunction with the method of FIG. 6, in accordance with an embodiment of the disclosure.

The controller 16 may be a computer associated with or included within the 3-D printer 14. The controller 16 may be hardwired to the 3-D printer 14 or may, additionally or alternatively, transmit instructions to the 3-D printer 14 via a network. FIG. 7 is a block diagram of the controller 16 as a computer capable of executing instructions to direct the 3-D printer 14 to manufacture the object(s) 12. The controller 16 may be, for example, a server, a personal computer, or any other type of computing device. The controller 16 of the instant example includes a processor 81. For example, the processor 81 may be implemented by one or more microprocessors or controllers from any desired family or manufacturer.

The processor 81 may include a local memory 82 and is in communication with a main memory including a read only memory 83 and a random access memory 84 via a bus 88. The random access memory 84 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 83 may be implemented by a hard drive, flash memory and/or any other desired type of memory device.

Further, the controller 16 may also include an interface circuit 85. The interface circuit 85 may be implemented by any type of interface standard, such as, for example, an Ethernet interface, a universal serial bus (USB), and/or a PCI express interface. One or more input device(s) 44 may be connected to the interface circuit 85. The input device(s) 44 permit a user to enter data and commands into the processor 81 (e.g., input data for the parameters 61, toolpath instructions 78, etc.). The input device(s) 44 can be implemented by, for example, a keyboard, a mouse, a touchscreen, a track-pad, a trackball, and/or a voice recognition system. One or more output devices 58 may also be connected to the interface circuit 85. The output devices 58 can be implemented by, for example, display devices for associated data (e.g., a liquid crystal display, a cathode ray tube display (CRT), etc.).

The controller 17 may include one or more network transceivers 89 for connecting to a network 91, such as the Internet, a WLAN, a LAN, a personal network, or any other network for connecting the controller 16 to the 3-D printer 14, one or more other controllers, and/or other network capable devices. As such, the controller 16 may be embodied by a plurality of controllers 16 for providing instructions to the 3-D printer 14.

As mentioned above the controller 16 may be used to execute machine readable instructions. For example, the controller 16 may execute machine readable instructions to calibrate the 3-D printer 14 and/or to direct the 3-D printer 14 to print the object(s) 12. In such examples, the machine readable instructions comprise a program for execution by a processor such as the processor 81 shown in the example controller 16. The program may be embodied in software stored on a tangible computer readable medium. Such computer readable medium as used herein refers to any non-transitory medium or combination of media that participates in providing instructions to a processor for execution. Such a medium comprises all computer readable media except for a transitory, propagating signal. For example, such computer readable medium may include a CD-ROM, a floppy disk, a hard drive, a digital versatile disk (DVD), a Blu-ray disk, or any other memory associated with the controller 16.

INDUSTRIAL APPLICABILITY

The present disclosure relates generally relates to additive manufacturing systems and, more particularly, relates to systems and methods for calibrating apparatus used in additive manufacturing. The systems and methods disclosed herein may be employed to produce consistent builds of objects of a material, based on a determined energy density. Accordingly, use of such systems and methods may be applicable to easily and quickly, with respect to prior art methods, determine calibration data for other configurations and/or materials used in additive manufacturing. To that end, use of the disclosed systems and methods may reduce experimental time and labor required to properly calibrate a 3-D printer, as the empirical use of energy density and such determinations may drastically reduce the amount of time needed to calibrate a 3-D printer for a given build and/or material.

Figure 6:
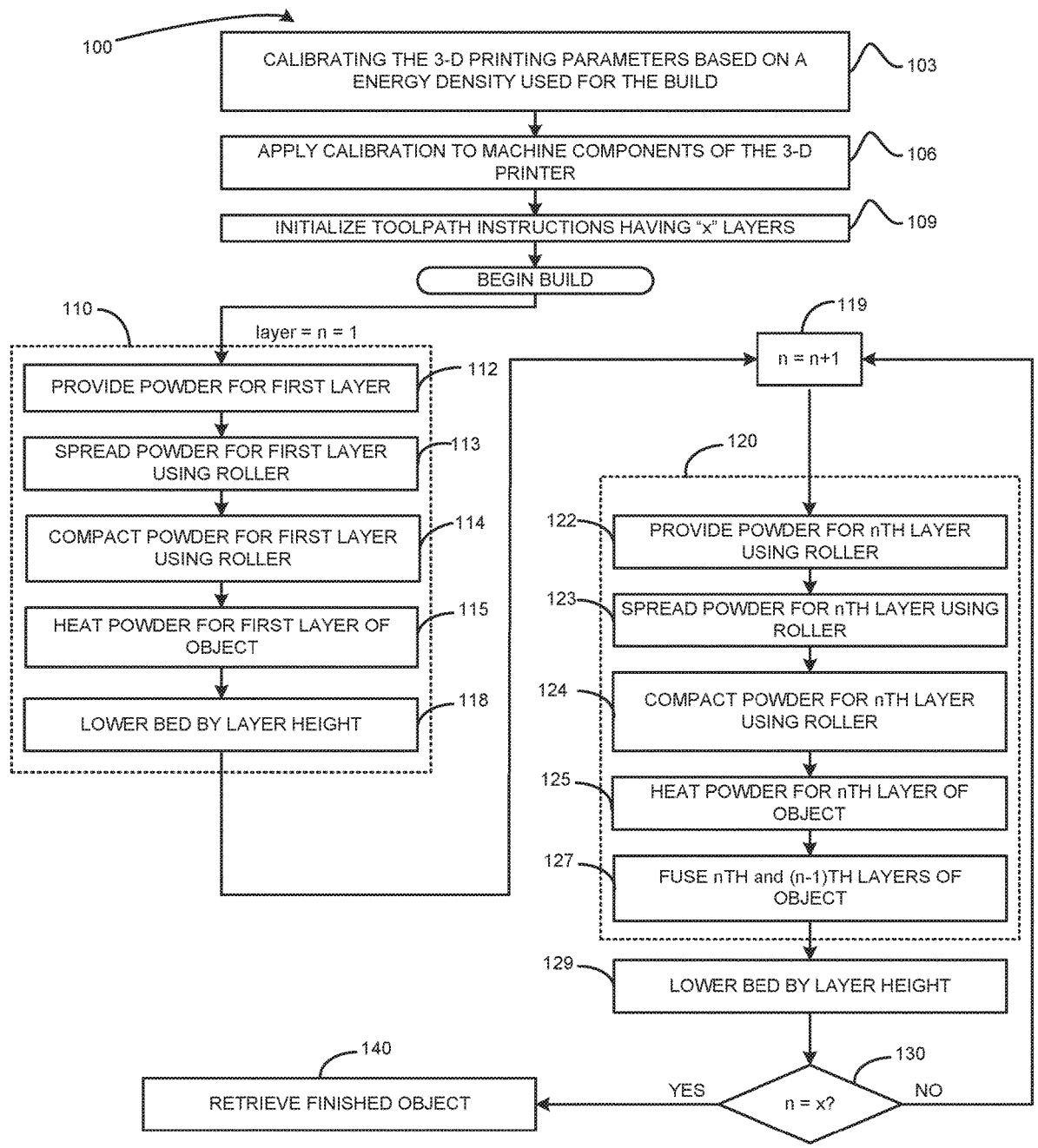
FIG. 6 is a block diagram illustrating a flow chart for a method for manufacturing one or more objects, in accordance with an embodiment of the present disclosure.

Turning now to FIG. 6, a flowchart for a method 100 for manufacturing one or more of the object(s) 12 is shown. The method 100 may be executed using the system 40 and, in some examples, by directing the 3-D printer 14 using instructions provided by the controller 16. Accordingly, the method 100 is described, below, with reference to elements of the 3-D printer 14, the controller 16, and/or the system 40, as described in detail above with reference to FIGS. 1-5. However, the method 100 is certainly not limited to application in conjunction with the 3-D printer 14, the controller 16, and/or the system 40 and the method 100 is capable of being performed on or using other machines, controllers, and/or systems.

The method 100 may begin at block 103, wherein, for example, the system 40 may be utilized to calibrate the 3-D printer 14 for a 3-D printing operation based on the parameters 61 and/or the energy density 70. To that end, block 103 may be implemented via a sub-method 200 for calibrating the 3-D printer 14, illustrated in FIG. 7, the sub-method 200 being utilized in conjunction with the method 100.

The sub-method 200 may begin at block 210, wherein the transverse speed 69 and/or the laser spot area 64 may be determined based on the ideal build. As discussed above, determining one or both of the transverse speed 69 and the laser spot area 64 may be determined during single bead testing for determining the ideal build characteristics for the ideal build. For example, one or both of the laser spot area 64 and the transverse speed 69 may be determined during single bead testing, as discussed above. In such examples, the transverse speed 69 may be based on the amount of time it takes to heat the powder to achieve the ideal single weld bead, while the laser spot area 64 may be derived from an area fulfilled by the ideal single weld bead.

Once such characteristics are determined for an ideal build in block 210, if the transverse speed 69 and laser spot area 64 are acceptable for the ideal build, then the sub-method 200 may proceed to block 220, otherwise experimentation for block 210 may continue, as depicted at the decision 215. At block 220, the bead overlap 68 and the build layer thickness 66 for building the object based on the ideal build may be determined based on performance of surface testing by printing overlapping weld beads to obtain measurements for the bead overlap 68 and the build layer thickness 66 for the ideal build, as discussed above. If the bead overlap 68 and build layer thickness 66 are acceptable as ideal, then the sub-method 200 may continue to block 230, otherwise additional experimentation via surface testing may continue at block 220, as depicted at the decision 225.

At block 230, the sub-method 200 may include determining the energy density 70 for the ideal build based on the parameters 61, determined at blocks 210, 220. As discussed above, the energy density 70 may be determined by utilizing the equation (1) and/or the equation (2). As depicted in decision 235, in some examples, it may be desired to alter one or more of the parameters 61. In such examples when the method 200 desires to alter at least one of the parameters 61 to a new value after the energy density 70 is initially determined, the sub-method 200 may include altering one or more of the parameters 61, that were not altered to a new value, while maintaining a constant value for the energy density 70, as depicted in block 240. In some additional or alternative examples, as depicted at decision 245, the sub-method 200 may desire to alter the operations to use a second material for the build, wherein the previously calculated values are for a first material. In such examples, as discussed at length above, the sub method 200 may desire to determine a second, altered energy density to build an object out of the second material, but substantially maintaining the ideal build properties achieved from building an object of the first material via energy density 70 based calibration. In such examples, the sub method 200 may include block 250, wherein the second energy density is determined by altering the energy density 70 to the second energy density based on an energy compensation factor, such that the 3-D printer 14 is capable of manufacturing the object from the second material while maintaining the ideal surface properties achieved by performing manufacturing based on the energy density 70.

Based on any calibration instructions and/or data determined by blocks 210, 220, 230, 240, 250, the sub-method 200 may output said configuration data and/or instructions for commencement of a build of an object by the 3-D printer 14. To that end, reference is now made back to the method 100 of FIG. 6, which then continues from block 103 to block 106, in which the calibration data and/or instructions is applied to machine components (e.g., the laser 18, the power source 52) of the 3-D printer 14, to calibrate the 3-D printer in accordance with the calibration data and/or instructions.

At block 109, the 3-D printer 14 receives the toolpath instructions 78 for 3-D printing the object(s) 12. Instructions for 3-D printing the object 12 may include "x" number of layers 22, wherein x is an integer representative of the number of layers 22 needed to complete manufacturing of the object 12. Therefore, as shown, the method 100 may be an iterative process having a series of layers to be printed (e.g., layers=[1 . . . x]), denoted by a set of consecutive integers. Accordingly, the current iteration for the current layer that the method 100 is printing can be denoted as the "nth" layer of the object 12. While the method 100 is described herein with reference to the structures and elements of the embodiments of FIGS. 1 and 2, the method 100 may additionally be used to produce other objects.

After receiving instructions, the method 100 may continue to a first process 110 for completing a first layer of the object 12. As such, the initial value of "n" may be 1. The first process 110 includes block 111, wherein the powdered material 20 is provided for the first layer of the object 12. Then, the roller 24 may spread the provided powdered material 20 to produce a powder layer (e.g., the powder layer 26) from which the first layer may be printed, as shown in block 113. Further, the roller may also compact the powder for the first layer, as shown in block 114. The laser 18 may then selectively heat the object portion 44 of the powder layer 26 to produce the first layer of the object 12, as shown in block 115.

To proceed to the next iteration of the method 100, the object bed 28 may then be lowered by a layer height, in advance of the printing of the next layer of the object 12 and the roller support structure 40, as shown in block 118. The method 100 may then include increasing n by 1 (see block 119: n=n+1) and continue to a nth process 120, which provides instructions for forming the nth layer of both the object 12 and the roller support structure 40.

The nth process 120 may be executed in a similar manner to the process 110, but for the nth layer of the object 12. As shown, the nth process 120 then will provide powder for the nth layer (block 122), spread the powdered material 20 for the nth layer using the roller 24 (block 123), compact the powder for the first layer (block 124). selectively heat the powder for the nth layer of the object 12 (block 125), and selectively heat the powder for the nth layer of the roller support structure 40 (block 126). As mentioned above, during 3-D printing processes, successive layers may be fused together during the heating of the current layer. As such, the process 110 may include fusing the nth layer of the object 12 to the (n−1)th layer of the object 12 (block 127). Once the heating of the powder is complete, the nth process 120 may lower the object bed 28 by the layer height, as shown in block 129.

The method 100 may proceed by determining if n, the current iteration, is equal to x, the integer representing the final iteration of the method 100, as shown in block 130. If n is not equal to x, then the method 100 returns to block 119, adds 1 to n, and repeats the nth process 120 for the nth layer. If n is equal to x, then the method 100 continues to block 140, wherein the object 12 may be retrieved from the 3-D printer 14.

It will be appreciated that the present disclosure provides systems, methods, and apparatus for manufacturing objects utilizing 3-D printing. While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for manufacturing an object from a powdered material, such manufacturing based, at least, on toolpath instructions, the system comprising:
a laser configured to selectively heat the powdered material to form the object, in a series of layer-wise iterations, the laser configured to produce a laser beam having a laser spot area, the laser spot area being an area in which the laser selectively heats the powdered material, the laser spot area being configurable, and the laser configured move above the powdered material, during execution of the toolpath instructions, at a transverse speed;
a power source configured to power the laser to selectively heat the powdered material, the power source having a power level that is configurable; and
a controller, including a processor, configured to:
determine an energy density necessary for an ideal build for the object, the ideal build having ideal surface properties for the ideal build including, at least, a bead overlap and a build layer thickness, the energy density based on a plurality of parameters, the plurality of parameters including, at least, the power level, the laser spot area, the transverse speed, the bead overlap, and the build layer thickness,
determine calibration instructions for calibrating one or both of the power source and the laser based, at least, on the energy density,
calibrate one or both of the power source and laser based, at least, on the calibration instructions, and
execute, after calibration, toolpath instructions to form the object.

2. The system of claim 1, wherein determining the energy density, by the controller, is further based on an energy density formulation, the energy density formulation defined as $$E=((P/A)/((L^3/d\times T))/S)),$$

wherein E is the energy density, P is the power level, A is the laser spot area, d is the bead overlap distance, T is the build layer thickness, S is the transverse speed, and L is a dimensional constant for the equation.

3. The system of claim 2, wherein the laser has a laser spot, from which the laser spot area is measured, the laser spot having a circular shape having a laser spot radius, and wherein the energy density formulation is further defined as $$E=((P/(\pi r^2))/((L^3/(d\times T))/S)),$$

wherein r is the laser spot radius.

4. The system of claim 2, wherein, after determining the energy density, the controller is further configured to alter at least one of the power level, the laser spot area, the bead overlap, the build layer thickness, and the transverse speed to a new value, and
alter at least one of the power level, the laser spot area, the bead overlap, the build layer thickness, and the transverse speed, that were not altered to a new value, such that the new value is maintained and the energy density remains constant.

5. The system of claim 1, wherein at least one of the plurality of parameters is altered to a new parameter the remaining parameters of the plurality of parameters remain as original parameters, and
wherein at least one of the original parameters is altered such that, when changing to the new parameter, the energy density remains constant.

6. The system of claim 1, wherein the powdered material is a first powdered material, and
wherein the controller is further configured to determine a second energy density by altering the energy density to the second energy density based on an energy compensation factor, such that the system is capable of manufacturing the object from a second material while maintaining the ideal surface properties achieved by performing manufacturing based on the energy density.

7. The system of claim 6, wherein the energy compensation factor is based on a ratio between a product of the first material's first thermal conductivity ("$k_1$") and first melting temperature ("$m_1$") and a product of the second material's second thermal conductivity ("k2") and second melting temperature ("m2").

8. The system of claim 7, wherein the energy compensation factor ("$e_c$") is determined by the following formulation:

$$e_c=((k_1 \times m_1)/(k_2 \times m_2)).$$

9. The system of claim 8, wherein the second energy density ("$E_2$") is determined by the following formulation:

$$E_2=E \times e_c.$$

10. A method for configuring a 3-D printer for manufacturing an object, from a powdered material, for an ideal build for the object, the 3-D printer including, at least, a laser and a power source, the method comprising:
   determining a transverse speed, for the laser, for building the object based on the ideal build;
   determining a laser spot area, for the laser, for building the object based on the ideal build;
   determining a bead overlap and a build layer thickness for building the object based on the ideal build;
   determining an energy density necessary for the ideal build, the energy density based, at least, on the transverse speed, the laser spot area, the bead overlap, the build layer thickness, and a configurable power level for the power source, the power source configured to power the laser to selectively heat the powdered material;
   determining calibration instructions for calibrating the 3-D printer based, at least, on the energy density; and
   calibrating the 3-D printer based, at least, on the calibration instructions.

11. The method of claim 10, wherein determining the energy density, by the controller, is further based on an energy density formulation, the energy density formulation defined as $$E=((P/A)/((L^3/(d \times T))/S)),$$

wherein E is the energy density, P is the power level, A is the laser spot area, d is the bead overlap distance, T is the build layer thickness, S is the transverse speed, and L is a dimensional constant for the equation.

12. The method of claim 11, further comprising:
   altering, after the energy density is determined, at least one of the power level, the laser spot area, the bead overlap, the build layer thickness, and the transverse speed to a new value; and
   altering at least one of the power level, the laser spot area, the bead overlap, the build layer thickness, and the transverse speed, that were not altered to a new value, such that the new value is maintained and the energy density remains constant.

13. The method of claim 10, wherein the powdered material is a first powdered material, and
   wherein the method further comprises determining a second energy density by altering the energy density to the second energy density based on an energy compensation factor, such that the system is capable of manufacturing the object from a second material while maintaining the ideal surface properties achieved by performing manufacturing based on the energy density.

14. The method of claim 13, wherein the energy compensation factor is based on a ratio between a product of the first material's first thermal conductivity ("$k_1$") and first melting temperature ("$m_1$") and a product of the second material's second thermal conductivity ("$k_2$") and second melting temperature ("$m_2$"),
   wherein the energy compensation factor ("$e_c$") is determined by the following formulation:

$$e_c=((k_1 \times m_1))/((k_2 \times m_2)), \text{ and}$$

wherein the second energy density ("$E_2$") is determined by the following formulation:

$$E_2=E \times e_c.$$

15. The method of claim 10, wherein determining the laser spot area, for the laser, for building the object based on the ideal build, includes testing multiple single weld beads at multiple lens focus levels for the laser, determining the ideal weld bead from the testing, and deriving the laser spot area from the ideal weld bead.

16. The method of claim 15, wherein determining the transverse speed, for the laser, for building the object based on the ideal build is determined during the testing of single weld beads based on the amount of time the ideal single weld bead is heated to produce the ideal single weld bead.

17. The method of claim 10, wherein determining the bead overlap and the build layer thickness for building the object based on the ideal build is based on performance of surface testing by printing overlapping weld beads to obtain measurements for the bead overlap and the build layer thickness for the ideal build.

18. A three-dimensional (3-D) printer, comprising:
   an object bed on which one or more objects are formed;
   a powder bed for providing a powdered material to the object bed;
   a roller for spreading the powdered material on the object bed as a powder layer;
   a laser configured to selectively heat the powdered material to form the object, in a series of layer-wise iterations, the laser configured to produce a laser beam having a laser spot area, the laser spot area being an area in which the laser selectively heats the powdered material, the laser spot area being configurable, and the laser configured move above the powdered material, during execution of the toolpath instructions, at a transverse speed;
   a power source configured to power the laser to selectively heat the powdered material, the power source having a power level that is configurable; and
   a controller in communication with, at least, the object bed, the roller, and the laser, the controller including a processor and configured to:
      determine an energy density necessary for an ideal build for the object, the ideal build having ideal surface properties including, at least, a bead overlap and a build layer thickness, the energy density based on a plurality of parameters, the plurality of parameters including, at least, the power level, the laser spot area, the transverse speed, the bead overlap, and the build layer thickness,
      determine calibration instructions for calibrating one or both of the power source and the laser based, at least, on the energy density,
      calibrate one or both of the power source and laser based, at least, on the calibration instructions, and execute, after calibration, toolpath instructions to form the object.

19. The 3-D printer of claim 18, wherein determining the energy density, by the controller, is further based on an energy density formulation, the energy density formulation defined as $$E = ((P/A)/((L^3/(d \times T))/S)),$$

wherein E is the energy density, P is the power level, A is the laser spot area, d is the bead overlap distance, T is the build layer thickness, S is the transverse speed, and L is a dimensional constant for the equation.

20. The 3-D printer of claim 18, wherein the powdered material is a first powdered material, and wherein the controller is further configured to determine a second energy density by altering the energy density to the second energy density based on an energy compensation factor ("$e_c$"), such that the system is capable of manufacturing the object from a second material while maintaining the ideal surface properties achieved by performing manufacturing based on the energy density, the energy compensation factor being based on a ratio between a product of the first material's first thermal conductivity ("$k_1$") and first melting temperature ("$m_1$") and a product of the second material's second thermal conductivity ("$k_2$") and second melting temperature ("$m_2$"), wherein the energy compensation factor is determined by the following formulation:

$$e_c = ((k_1 \times m_1))/((k_2 \times m_2)), \text{ and}$$

wherein the second energy density ("E") is determined by the following formulation:

$$E_2 = E \times e_c.$$

* * * * *